United States Patent
Hediger

(10) Patent No.: US 12,343,837 B2
(45) Date of Patent: Jul. 1, 2025

(54) MONITORING ARRANGEMENT, CLAMPING SYSTEM WITH A MONITORING ARRANGEMENT AND METHOD FOR MONITORING A CLAMPING DEVICE BY MEANS OF A MONITORING ARRANGEMENT

(71) Applicant: Erowa AG, Reinach (CH)

(72) Inventor: Hans Hediger, Reinach (CH)

(73) Assignee: Erowa AG, Reinach (CH)

( * ) Notice: Subject to any disclaimer, the term of this patent is extended or adjusted under 35 U.S.C. 154(b) by 756 days.

(21) Appl. No.: 17/455,768

(22) Filed: Nov. 19, 2021

(65) Prior Publication Data
US 2022/0193850 A1    Jun. 23, 2022

(30) Foreign Application Priority Data
Dec. 21, 2020    (CH) ...................... 1635/20

(51) Int. Cl.
*B23Q 17/00*    (2006.01)
(52) U.S. Cl.
CPC .. *B23Q 17/005* (2013.01); *G05B 2219/50183* (2013.01)
(58) Field of Classification Search
CPC .................... B23Q 17/005; G05B 2219/50183
See application file for complete search history.

(56) References Cited

U.S. PATENT DOCUMENTS

| | | | | |
|---|---|---|---|---|
| 10,259,090 B2 * | 4/2019 | Van Sprang | ......... | B23Q 17/005 |
| 10,493,575 B2 * | 12/2019 | Hediger | ............... | B23Q 17/005 |
| 12,030,146 B2 * | 7/2024 | Kochl | .................. | B23Q 1/0027 |

FOREIGN PATENT DOCUMENTS

| | | |
|---|---|---|
| DE | 102013014036 A1 | 2/2015 |
| DE | 102019107711 A1 | 10/2020 |
| EP | 2093016 A1 | 8/2009 |
| EP | 2052808 B1 | 3/2010 |
| EP | 1998932 B1 | 12/2010 |
| EP | 2457688 A1 | 5/2012 |
| EP | 2759372 A1 | 7/2014 |
| EP | 3028804 A1 | 6/2016 |
| EP | 3391991 A1 | 10/2018 |
| EP | 3620248 A1 | 3/2020 |

* cited by examiner

Primary Examiner — Eric A. Gates
(74) Attorney, Agent, or Firm — Maginot, Moore & Beck LLP

(57) ABSTRACT

The invention relates to a monitoring arrangement (12) for monitoring the clamping quality of a workpiece carrier clamped in a clamping device (3, 40, 49) as well as a clamping system with clamping device (3, 40, 49) and such a monitoring arrangement (12). The monitoring arrangement comprises at least two sensors (A1-A4) for the independent detection of the clamping quality of a clamped workpiece carrier or workpiece. The monitoring arrangement also comprises a transmitting device (14) and a receiving device (21), wherein the transmitting device (14) is constituted such that it transmits the determined or calculated parameter or parameters redundantly to the receiving device (21).

15 Claims, 3 Drawing Sheets

MONITORING ARRANGEMENT, CLAMPING SYSTEM WITH A MONITORING ARRANGEMENT AND METHOD FOR MONITORING A CLAMPING DEVICE BY MEANS OF A MONITORING ARRANGEMENT

PRIORITY CLAIM

This application claims priority to pending Swiss patent application No. 01635/20, filed on Dec. 21, 2020, the entire disclosure of which is incorporated herein by reference.

BACKGROUND

The present invention relates to a monitoring arrangement, a clamping system constituted with a monitoring arrangement and a method for monitoring a clamping device by means of a monitoring arrangement.

With a monitoring arrangement of the type discussed here, clamping devices are to be monitored in particular with regard to whether a workpiece carrier—pallet—clamped by means of the respective clamping device or a workpiece clamped in the latter is clamped correctly and securely, wherein the measured parameter or parameters are to be transmitted wireless to a receiver.

A chuck is known from EP 3 391 991 A, which is designed for clamping pallets provided with a clamping spigot. The chuck is provided with a locating hole for the clamping spigot and a clamping device comprising clamping elements for clamping the clamping spigot in the locating hole. At least one sensor is arranged on the chuck, by means of which at least one parameter of the chuck and/or the interaction between the pallet and the chuck and/or the pallet can be detected. The chuck is provided with a transmitter for the wireless transmission of parameters determined by the sensor or sensors. The clamping force acting on the clamping spigot can be determined by means of a first sensor. For this purpose, the first sensor is designed and arranged on the chuck in such a way that material-elastic deformations of the chuck can be measured when the pallet is clamped. The chuck can also be provided with a second sensor, by means of which the mounting of a pallet on the chuck can be detected.

A chuck with a clamping head comprising three clamping jaws is known from EP 1 998 932 B1. The chuck comprises a rotation-symmetrical base body with a conical locating hole for receiving the clamping head. In order to pull the chuck into the locating hole, a draw tube is provided, which is part of a machine spindle. Such chucks are used especially in turning machines. A first sensor is provided at the outer surface of the chuck body, a second sensor being arranged in a recess at the outer surface of the chuck body. Finally, a third sensor is arranged on the draw tube. The sensors are designed as strain gauges and are each equipped with an integrated signal processing unit. A transmitting device for the wireless transmission of measurement values is assigned to each signal processing unit. The clamping force of the chuck should be able to be determined with this embodiment of the chuck. When a minimum clamping force is reached, maintenance of the chuck must be carried out. Positioning of the workpiece in the axial direction is not monitored and also cannot be determined. There is no message for the presence of a workpiece. Errors which can at all events arise in the wireless transmission are also not detected.

A clamping device with a chuck for the releasable fixing of a workpiece carrier is known from EP 2 052 808 A1. The chuck is provided with a locking mechanism, which comprises a plurality of clamping elements which in the locking position engage with a clamping spigot connected to the workpiece carrier. Each clamping element is provided with a through-hole, which is closed at one end when the respective clamping element is correctly locked. In addition, or alternatively, an actuating element provided with a through-hole is assigned to each clamping element, the through-hole whereof is closed at one end when the respective clamping element is correctly locked and/or unlocked. The through-holes of the clamping elements or of the actuating elements are connected via a common connecting line to a pneumatic source. At least one sensor for detecting the air flow is provided in the connecting line. By means of the sensor, it can be detected whether the clamping elements have been correctly unlocked or locked. The sensor is connected to an electronic control and evaluation device.

Furthermore, a clamping device for a machine tool is known from EP 2 759 372 A1. The machine tool comprises a rotatable spindle with a tool holding fixture for a tool. The clamping device is provided for clamping the tool. In order to detect correct or incorrect clamping of the tool in the tool holding fixture, the clamping device comprises force sensors at different measurement points, in order to detect the clamping forces acting respectively at the different measurement points. The force sensors are arranged on an annular seating surface of the tool holding fixture. The sensors project above the seating surface in such a way that they are compressed when the tool is clamped. The clamping force should thus be able to be detected on the one hand and it should be able to be detected whether the tool is correctly clamped or whether a misalignment and/or incorrect positioning is possibly present. AOW sensors (acoustic surface wave sensors) are used as force sensors. The force sensors are arranged on the seating surface rotationally symmetrical about the central axis of the machine tool. When there is correct alignment of the tool, the force sensors detect clamping forces of equal magnitude, whereas when the tool is clamped obliquely, clamping forces of different magnitude are detected by the force sensors. The electrical signals of the sensors are transmitted wireless to a transmitting and receiving unit and evaluated in an evaluation unit.

An intelligent multi-part clamping device emerges from EP 2 093 016 A1. The clamping device comprises a multiplicity of clamping jaws arranged on a base plate, wherein a fixed and a displaceable clamping jaw forms in each case a kind of vice. Workpiece mounting sensors or ram air-workpiece mounting controls are arranged in the clamping jaws, wherein the former are connected by cable to a radio module. A correct insertion into the clamping jaws is intended to be monitored by means of the sensors.

EP 3 028 804 A1 describes a transmission arrangement, in particular for energy and/or signal transmission and for use in a machining center. Signals and voltages are transmitted inductively from a fixed machine frame to a rotating chuck, both in the direction of the chuck and also vice versa. The respective chuck has clamping jaws, which are supported in a chuck body displaceably by means of an electric motor. The electric motors are switched off when a predefined ACTUAL position is reached, whilst the clamping jaws are stopped by means of spring assemblies and mechanical friction brakes. The electric motors compress the spring assemblies during the clamping process, so that the latter apply the clamping force for the clamping jaws. After the electric motors have been switched off, the mechanical friction brakes prevent slipping or release of the clamping jaws. Moreover, the positions of the clamping jaws are permanently monitored during the processing operation, in order to detect processing errors or even release of a clamped workpiece. In order to be able to permanently monitor the corresponding operating states and positions of the clamping jaws and/or electric motors, a multiplicity of measurement sensors are assigned to the latter, which generate corresponding measurement data and transmit the latter via the inductive transmitting devices. The inductive transmitting devices are designed in two parts, on the one hand in the rotating chuck and on the other hand in the fixed carrying frame. The two transmitting devices are aligned flush with one another, so that, as a result of the spatial separation of the two transmitting devices, rotation of the chuck is possible and at the same time inductive transmission of measurement signals, measurement data and/or voltages for the operation of the electric motors can be transmitted.

EP 3 620 248 A1 shows a coupling device, by means of which data can be transmitted inductively from a rotatable part to a rotationally fixed one. In particular, a chuck rotating during the operation can be connected to a customer-side control device and monitored by means of the coupling device. The chuck comprises radially displaceable clamping jaws, in order thus to fix a workpiece. Each clamping jaw is driven by means of an assigned electric motor. In order to supply the chuck rotating during the processing operation of a clamped workplace with energy, a first transmitting device is provided in the chuck, which is connected by electrical lines to the electric motors and measurement sensors. The position of the clamping jaws and the voltages of the electric motors or the speed thereof are intended to be measured by the measurement sensors. A second transmitting device arranged rotationally fixed is fitted on a carrier frame. The measurement data are transmitted inductively from the first rotatable transmitting device to the second one which is arranged rotationally fixed. The second transmitting device is connected by means of electrical lines to a programmable interface. In a variant of the chuck, provision is made such that the latter is provided with two interfaces which are connected to the second transmitting device. Both interfaces receive, independently of one another, the measurement data sets of the measurement sensors and evaluate them. If the measurement results of the two interfaces agree, the control device receives a release signal, whereas the processing operation is interrupted or not released in the case of divergent measurement results.

Finally, EP 2 457 688 A1 discloses a method for workpiece positioning and fixing. The presence or absence of workpieces or workpiece carriers can be ascertained by means of process steps.

SUMMARY OF THE DISCLOSURE

The problem addressed by the invention is to create a monitoring arrangement belonging to the technical field mentioned at the outset for monitoring the clamping quality of a workpiece carrier or workpiece clamped on a clamping device, which monitoring arrangement makes it possible for one or more parameters, in particular parameters such as enable information to be deduced as to secure clamping of a clamped workpiece carrier or workpiece, on the one hand to be able to be reliably detected and on the other hand to be able to be securely and reliably transmitted to a receiver without the data lines.

According to the invention, the monitoring arrangement for monitoring the clamping quality of a workpiece carrier or workpiece clamped in a clamping device comprises at least two sensors for the independent detection of the clamping quality of a clamped workpiece carrier or workpiece, wherein the transmitting device is designed in such a way that it transmits the determined or calculated parameter or parameters redundantly to the receiving device. Due to the fact that at least two sensors are provided for the independent detection of the clamping quality of a clamped workpiece carrier or workpiece, errors which a single sensor could deliver can be detected, for example by cross-comparison of the measurement data. By means of a redundant transmission of the measurement data by a transmitting device to a receiving device, errors on the transmission link can also be detected and eliminated as required.

With a preferred development, provision is thus made such that the monitoring arrangement comprises at least one sensor module, by means of which the measurement values present at the sensors are digitalized and transmitted to the transmitting device. Such preparation of the measurement data increases the reliability and simplifies the transmission of the measurement values to the transmitting device. In addition, the respective sensor module can where applicable also be used to feed a sensor or a plurality of sensors.

In a particularly preferred development of the monitoring arrangement, the transmitting device is provided with two independent microprocessor units, which are configured to prepare the measurement values transmitted by the respective sensor module in each case independently and redundantly. This embodiment on the one hand contributes to immediately detecting errors in a message and, as required, checking whether a measurement is plausible. On the other hand, different and independent microprocessors can also be programmed differently, which is advantageous with regard to redundant measurement data detection and processing.

The transmitting device preferably comprises at least one transmitting antenna for the transmission of the measurement data prepared by means of the two independent microprocessor units. The measurement data can be transmitted with the transmitting antenna wireless to the receiving device and the aforementioned components can be grouped together in a compact and power-saving component.

Very particularly preferably, the monitoring arrangement comprises at least two sensors, which are arranged such that their measurement values correlate positively with one another. It enables a particularly straightforward check on the measurement values with regard to their correctness, since the detected measurement values can be compared with one another by cross-comparison.

The monitoring arrangement particularly preferably comprises at least two sensors, which are designed and arranged in such a way that material-elastic deformations of a chuck or vice of the clamping device can be measured during the clamping of a workpiece carrier or a workpiece, wherein the sensors are in particular strain gauge sensors (DMS). DMS sensors are characterized by their high accuracy and good long-term stability, so that by means of the aforementioned arrangement of the sensor's information can very easily be deduced with regard to the actually present clamping force.

In a further preferred development, the monitoring arrangement comprises at least one further sensor, by means of which the mounting of the workpiece carrier on the clamping device can be detected. By means of such a sensor, it can be detected whether the workpiece carrier actually lies in the provided position directly on the Z-supports of the clamping device, or whether it lies on fouling such as for example a chip and therefore is not positioned correctly in the Z-direction.

A further embodiment of the monitoring arrangement serves for the monitoring of the clamping quality of a workpiece clamped in a vice of a clamping device, wherein the monitoring arrangement in this preferred example comprises at least two further sensors, by means of which the mounting of a workpiece on the respective guide block of the vice can be detected. It can thus be detected whether the workpiece is clamped correctly or for example obliquely.

A preferred development of the monitoring arrangement also makes provision such that the latter is provided with a further sensor, by means of which the position of an element used for actuating clamping elements can be detected. This embodiment is important particularly with regard to automatic feeding or automatic removal of the workpiece carrier by means of a robot, since the aforementioned element must be in its initial or open position for actuating the clamping elements, in order that a workpiece carrier can be fed or removed.

In a particularly preferred development, the monitoring arrangement comprises a receiving antenna for receiving data transmitted by means of the transmitting device and a gateway connected to the receiving antenna, wherein the gateway is provided with two independent microprocessor units, by means of which the received data are independently and redundantly further processed in each case, and wherein the gateway is connected to a machine control of a processing machine. This embodiment contributes to the fact that the data can be reliably received and transmitted by means of the gateway to the machine control of the processing machine.

In a particularly preferred development of the monitoring arrangement, the gateway processes the measurement values transmitted by the transmitting device in such a way that, when agreement of the detected measurement values is ascertained and predetermined measurement values of the machine control are reached, a signal is outputted redundantly to the machine control for a correctly clamped workpiece carrier or a correctly clamped workpiece and/or for a reliable operation of the machine tool. A reliable operation of the processing machine can thus be ensured, in that a release signal is present only when the workpiece carrier or the workpiece is securely and correctly clamped.

A further problem of the invention consists in developing a clamping system with a clamping device for clamping a workpiece carrier or a workpiece and a monitoring arrangement constituted in such a way that it can be reliably detected whether the workpiece carrier or the workpiece is securely clamped.

This problem is solved with a clamping system as described herein. Due to the fact that the monitoring arrangement of the clamping system is provided with at least two sensors arranged in the clamping device for the independent detection of the clamping force acting on a clamped workpiece carrier or a clamped workpiece, the measurement values relevant for secure clamping of the workpiece carrier or the workpiece are detected twice and independently of one another. The basic pre-requisite is thus created that it can be reliably detected whether the workpiece carrier or the workpiece is securely clamped.

The clamping system is preferably constituted in such a way that the transmitting device of the monitoring arrangement comprises a radio transmitter arranged on the clamping device and the receiving device comprises a radio receiver arranged remote from the latter, wherein the transmitting device comprises two independent microprocessor units, which are configured in order to prepare the measurement values transmitted by the respective sensor module independently and redundantly and to check their plausibility by cross-comparison of the measurement data. Redundant pre-processing of the measurement data with regard to their plausibility can thus already be carried out at the transmitter side, i.e., in or on the clamping device.

According to a particularly preferred example of embodiment of the clamping system, strain gauges are used as sensors, which are fitted friction-locked and/or firmly bonded to a chuck or a vice of the clamping device in such a way that their signal is essentially proportional to the clamping force. Since DMS has a high degree of accuracy and good long-term stability, they are particularly advantageously suited, by measuring a material deformation on the chuck or vice, for providing precise information concerning the clamping force acting on the workpiece carrier or the workpiece and thus the quality of the clamping.

In a further preferred embodiment of the clamping system, the clamping device thereof comprises at least one chuck for clamping a workpiece carrier, wherein the chuck comprises a sensor arranged in the region of the upper side for detecting the mounting of the workpiece carrier. The precise Z-position of the workpiece carrier can be determined by such a sensor, which is important for example with regard to possible fouling in the region of the Z-supports.

A particularly preferred development of the clamping system is provided with a chuck for clamping a workpiece carrier provided with a clamping spigot, wherein the chuck is provided with an actuating piston displaceable between an initial and a locking position for actuating clamping elements for clamping the clamping spigot and the chuck is provided with a further sensor for monitoring the position of the actuating piston. The detection of the position of the actuating piston is particularly important with regard to automatic equipping of the clamping system by means of a handling robot, in particular in order not to cause undesired damage.

A particularly preferred embodiment of the clamping system comprises at least two chucks for clamping a workpiece carrier provided with a number of clamping spigots corresponding to the number of chucks, wherein each chuck is provided with an actuating piston displaceable between an initial and a locking position for actuating clamping elements for clamping the respective clamping spigot, and wherein at least one chuck is provided with a further sensor for monitoring the position of the actuating piston. Due to the fact that the position of at least one actuating piston is monitored, information can also be deduced with regard to whether a workpiece carrier can in principle be fed or withdrawn.

In an alternative embodiment of the clamping system, the clamping device is constituted as a vice with two clamping jaws, wherein a sensor for determining the clamping force of a clamped workpiece is assigned to each clamping jaw. Due to the fact that the clamping force is determined from both clamping jaws, information can be deduced as to whether a workpiece is securely clamped or not.

Finally, a further problem of the invention consists in developing a method for monitoring a clamping device of a processing machine by means of a monitoring arrangement constituted as described herein, in such a way that it can be determined reliably and in a straightforward manner whether the quality of the clamping of a clamped workpiece carrier or workpiece meets a specific requirement, wherein the control of the processing machine and/or an associated handling robot can be influenced on the basis of the measurement values.

This problem is solved with a method described herein. Due to the fact that the quality of the clamping of a workpiece carrier or workpiece clamped in the clamping device is determined by means of at least two independent sensors, that the measurement data determined by means of the respective sensor are compared with one another and checked for plausibility, and that the determined or calculated parameter or parameters is/are transmitted redundantly to the receiving device by means of the transmitting device and that the control of the processing machine is influenced on the basis of the measurement values present, the reliability can be ensured during the processing of a workpiece clamped on the processing machine by means of the clamping device or the workpiece carrier.

In a particularly preferred method, the checking for plausibility includes a check on agreement of the parameters determined and compared with one another after their preparation by means of the two independent microprocessor units of the transmitting device. Thus, apart from a double detection of the measurement values relevant for secure clamping, a redundant evaluation is also provided.

In a particularly preferred development of the method, the determined or calculated parameter or parameters are transmitted by means of the transmitting device redundantly and in the form of data packets to the receiving device, wherein it is checked at the receiver side whether the transmitted data are plausible. Errors on the radio link can thus be detected.

A further preferred method makes provision such that, when the parameters determined and compared with one another agree and predetermined measurement values are reached, a release signal for secure working is generated by means of the gateway and transmitted redundantly to the control of the processing machine. A release signal is thus present only when the pre-requisites required for a reliable operation of the processing machine are met, namely the workpiece carrier or the workpiece are securely clamped.

Finally, in a very preferred development of the method, provision is made such that the gateway emits the release signal in the form of a binary signal, wherein the release signal assumes the value 1 when the detected measurement values are plausible and reach a predetermined value, and wherein the release signal assumes the value 0 when the detected measurement values are either not plausible or do not reach a predetermined value. Positive reliability can thus be achieved, in that the release signal only assumes the value 1 when the workpiece carrier or the workpiece is correctly and securely clamped. In the case of a defect such as for example a power failure, the release signal automatically assumes the value 0, which is immediately detected by the machine control and leads to a standstill of the machine or at least to an error message.

Further advantageous embodiments and combinations of features of the invention emerge from the following detailed description and the entirety of the claims.

DESCRIPTION OF THE FIGURES

The figures of the drawings used to explain the examples of embodiment show.

DETAILED DESCRIPTION

Figure 1:
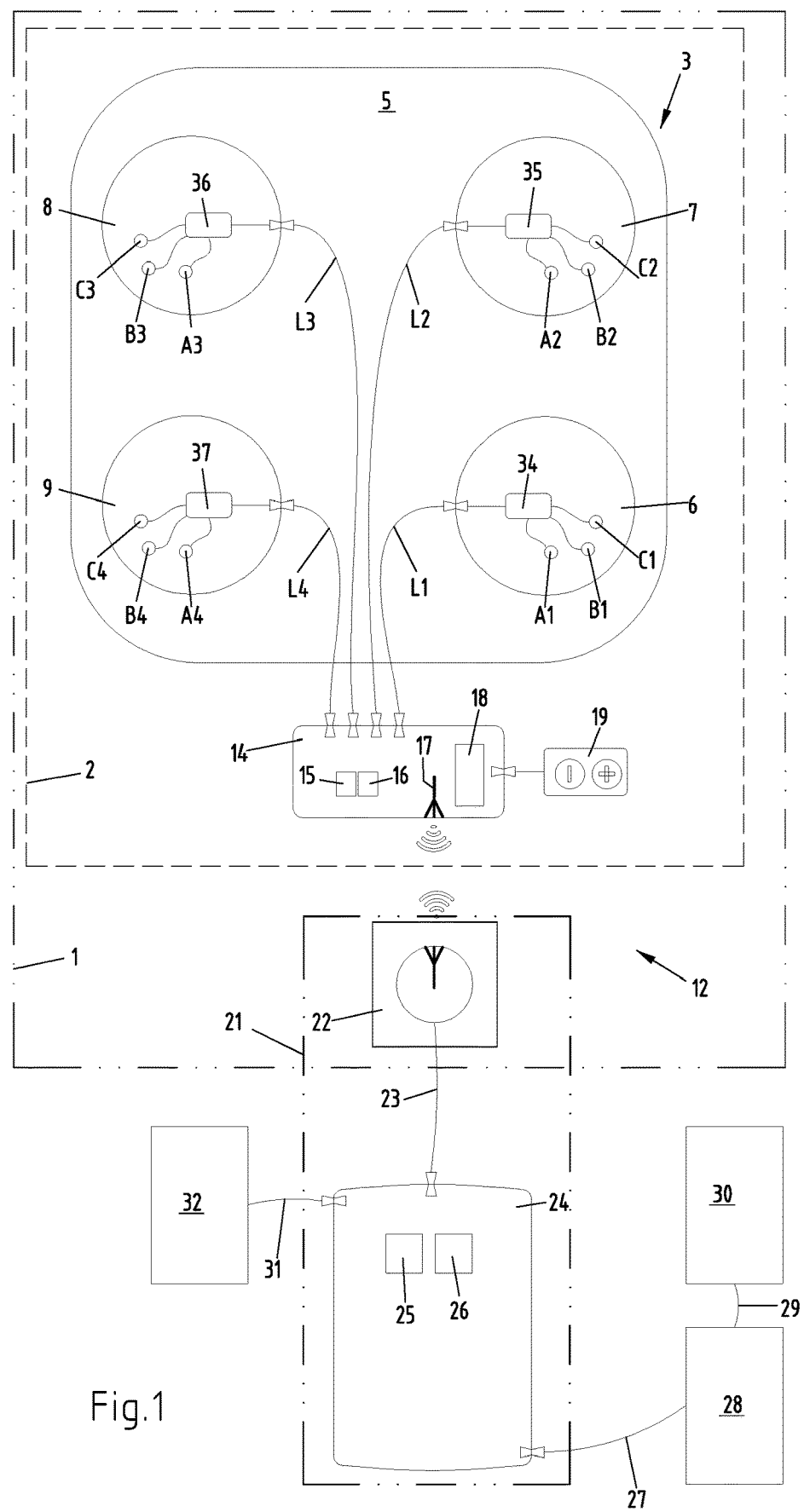
FIG. 1 a first clamping device together with a monitoring device in a diagrammatic representation.

FIG. 1 shows a clamping device 3 together with a monitoring device 12 in a diagrammatic representation. By means of a first rectangle 1, a machine space is indicated diagrammatically, in which a processing machine stands, on which clamping device 3 is used. A clamping system is symbolized by means of a dashed line 2, which comprises clamping device 3 and a part of monitoring device 12. Clamping device 3 in the present example is a so-called quadruple chuck, wherein four chucks 6, 7, 8, 9 are arranged on a base plate 5. The respective chuck has a central locating hole (not represented) for receiving and clamping a clamping spigot arranged on a workpiece carrier (not represented). For the clamping of a clamping spigot in the locating hole, respective chuck 6, 7, 8, 9 is provided with a clamping mechanism. The upper side of the four chucks forms the X-Y plane of the chuck, whilst the so-called Z-axis runs perpendicular thereto. Since such chucks are known in principle, for example from EP 3391991 A or DE 102013014036 A1, the respective chucks are represented only schematically and only some features relevant in connection with the invention are dealt with.

Apart from a plurality of sensors for detecting the clamping quality of a clamped workpiece carrier, monitoring device 12 comprises a transmitting device 14 and a receiving device 21 indicated by a dashed line. In the present example, three sensors A1, B1, C1; A2, B2, C2; A3, B3, C3; A4, B4, C4 are assigned to each chuck 6, 7, 8, 9, the function of which will be described in greater detail in the following. The three sensors A1-C1; A2-C2; A3-C3; A4-C4 of respective chuck 6, 7, 8, 9 are each connected to a sensor module 34, 35, 36, 37, in which preparation of the measurement values measured by means of the respective sensors is carried out. The respective sensor module is responsible on the one hand for feeding the sensors (strain gauges or Wheatstone bridge circuit, inductive sensors etc.). On the other hand, an A/D converter is integrated, which digitalizes the analogue measurement signals, so that these measurement data can be transmitted digitally over comparatively few lines L1-L4, in the ideal case over one line per sensor module 34, 35, 36, 37, to transmitting device 14. Transmitting device 14 is provided with two independent microprocessor units 15, 16, which carry out pre-processing of the measurement data. The two microprocessor units 15, 16 are preferably provided with different microprocessors, in order to ensure independent and redundant preparation of the measurement data. Transmitting device 14 is also provided with a radio module—radio transmitter—and a transmitting antenna 17 for the wireless transmission of the measurement data. In the present example, a transmitting antenna 17 is provided for transmitting the measurement data prepared by means of the two microprocessor units 15, 16. Furthermore, clamping system 2 is provided with an acceleration sensor 18, which as represented here can be arranged in the region of transmitting device 14.

For the supplying of transmitting device 14, use is made of a power supply 19 preferably in the form of batteries or accumulators, which can be housed for example in a separate battery compartment in clamping device 3, neither the batteries nor the battery compartment being represented in detail. A power pack, an inductive supply or a device for energy conversion from the environment (energy harvesting) can also be provided as required.

Receiving device 21—radio receiver—arranged remote from clamping device 3 comprises, apart from a receiving antenna 22, a gateway 24 for preparing the data. The generally known and employed technical term gateway denotes a transfer point as a switching device, in particular as a switching device in computer networks. In computing, a gateway is understood to mean a component (hardware and/or software), which produces a connection between two systems. Gateway 24 also comprises two independent microprocessor units 25, 26 for evaluating the received data. Here too, the two microprocessor units 25, 26 are preferably provided with different microprocessors, in order to ensure independent and redundant processing of the received measurement data. Different and independent microprocessors can also be programmed by means of different software, which in turn contributes to reliability.

Receiving antenna 22 is connected via a first cable 23 to gateway 24, which for its part is connected via a second cable 27 to a machine control 28. Machine control 28 is connected via a third cable 29 to a handling robot 30. Gateway 24 is also connected via a fourth cable 31 to a service tool 32. Although gateway 24 is shown here outside line 2 symbolizing the clamping system, it generally also forms a component of monitoring device 12 and is assigned to the clamping system. By means of handling robot 30, clamping device 3 can feed or remove the workpiece carrier or workpiece. Machine control 28 controls the processing machine, on which clamping device 3 is used. Finally, the service tool serves as a tool for calibration and diagnosis. Although the aforementioned cables 23, 27, 29, 31 are represented only diagrammatically here by a line in each case, the term cable in the present connection stands for any kind of electrical connection, wherein both single- and also multi-core electric lines as well as a plurality of independent lines are to be understood thereby. Thus, gateway 24 is connected for example via at least two lines to machine control 28, which will be explained in greater detail below.

By means of antenna 22, gateway 24 receives the data transmitted digitally by transmitting device 14 and evaluates the latter. For the wireless data transmission, use is preferably made of a standardized interface such as for example Bluetooth, ZigBee or a proprietary radio transmitter in the frequency region of 2.4 GHz, wherein Bluetooth Low Energy (BLE) radio engineering is very particularly preferably used, as is explained in greater detail below.

On the basis of the transmitted data, gateway 24 can detect the status of the clamping device such as for example chuck open, no pallet present, pallet in place, pallet clamped, pallet clamped with 10 kN etc. and can relay the latter to machine control 28 or a process control system connected thereto. Machine control 28 or the process control system can transmit commands to handling robot 34, for example transfer workpiece carrier to clamping device 3 or remove workpiece carrier from clamping device 3. In the case of a malfunction or the detection of inadequate mechanical clamping, especially also during the processing of a workpiece carrier clamped on clamping device 3, the respective processing machine can be immediately stopped. At all events, the control of the processing machine and/or an associated handling robot can be influenced on the basis of the measurement values present at the sensors.

Of the three sensors per chuck 6, 7, 8, 9, a first sensor A1, A2, A3, A4 in each case serves to determine the clamping force with which a clamping spigot is clamped in the respective chuck. For this purpose, use is preferably made of a sensor on the basis of a strain gauge, referred to hereinafter as DMS, by means of which material-elastic deformations of the chuck, in particular of the housing, can be measured. Information can thus be deduced concerning the force with which a clamping spigot is pulled into the respective chuck or is clamped therein.

In each case, a further sensor B1, B2, B3, B4 serves on the one hand to check the presence of the workpiece carrier. On the other hand, the precise Z-position of the workpiece carrier can also be determined by means of respective sensor B1, B2, B3, B4. For this purpose, use is preferably made of an inductively operating sensor, which is arranged in the region of the upper side of chuck 6, 7, 8, 9, in such a way that it detects the presence or mounting of a workpiece carrier.

In each case, a further sensor C1, C2, C3, C4 serves to monitor the position of an actuating piston used to actuate clamping elements. By means of the actuating piston, the clamping elements—clamping balls—used to clamp a clamping spigot can be pushed radially inwards, so that the latter abut fiction-locked against the clamping spigot. When the clamping elements are pushed radially inwards by the actuating piston, the latter is in the active position. If the actuating piston is pushed into the initial position, the clamping elements are in the open position or they can at least be pushed back into the open position. In the open position of the actuating piston, a clamping spigot can thus be introduced into the chuck or removed therefrom, whereas in the locking position of the actuating piston the clamping elements are in the clamping position, in which a clamping spigot is clamped in the chuck. If the actuating piston is in the locking position, a clamping spigot can neither be introduced into the chuck nor removed therefrom. In the case of such chucks, the actuating piston is usually operated pneumatically, wherein it is moved pneumatically into the open position, whereas it is pushed by means of spring action into the locking position and held there by means of self-retention. This has the advantage that the chuck is locked in the unpressured state, so that the workpiece carrier is and remains securely clamped also without compressed air.

It goes without saying that three sensors per chuck 6, 7, 8, 9 certainly do not have to be provided, but rather that it can suffice, depending on the requirement, to provide one, two or three sensors per chuck. If appropriate, it is even sufficient to provide a sensor only at two of the four chucks in each case. In such a case, a sensor would preferably be arranged in each case at two chucks 6, 8 or 7, 9 lying diagonally opposite one another, by means of which sensor the clamping force can be measured with which the respective clamping spigot is clamped in the chuck.

Finally, acceleration sensor 18 is used to determine the position of clamping device 3. In addition, movements of clamping device 3 can also be monitored with acceleration sensor 18. Thus, for example, vibrations which arise during the processing of a workpiece can be continuously monitored and, in the event of the detection of a limiting value being exceeded, the processing operation can be immediately stopped.

The Bluetooth Low Energy (BLE) technology particularly preferably used for the radio transmission requires very little energy for the transmission and has a range of approx. 10 meters. In addition, BLE is an internationally standardized radio interface and thus usable worldwide with a frequency of 2.4 GHz. Since BLE is also used for example in smartphones, the corresponding components are manufactured in very high part numbers and can thus be obtained at a favorable cost. For example, a smartphone could thus also communicate with the chuck. This technology thus has very many advantages, for example also compared to the inductive transmission used in EP 3 028 804 A1.

Several possible functioning modes of the monitoring device are explained below.

Example 1

In this example, it is assumed that only one sensor per chuck 6, 7, 8, 9 is provided in each case, namely a DMS sensor A1, A2, A3, A4 for measuring the clamping force present.

Once a workpiece carrier (not represented) is clamped in clamping device 3, the data are measured by means of DMS sensors A1, A2, A3, A4 and data digitalized in sensor modules 34, 35, 36, 37 are processed in parallel in the two microprocessor units 15, 16 of transmitting device 14. The measured data of the various sensors are processed independently of one another by means of the two microprocessor units 15, 16 and checked for their plausibility by cross-comparison of the measurement data. The measurement values present at the four DMS sensors A1, A2, A3, A4 may diverge from one another at most by a predetermined value in each case. If the determined measurement values lie within a predefined tolerance window, the measurement values are transmitted by means of transmitting device 14 to receiving device 21. If, however, the measurement values diverge markedly from one another, it can thus already be detected at the transmitter side that an error is present and, if need be, an error message can be outputted, wherein the measurement values can nonetheless be transmitted to receiving device 21.

Apart from the previously mentioned cross-comparison of the measurement values, by means of which the plausibility of the measurement values is determined, the absolute measured value is of course also used to determine whether a workpiece carrier or a workpiece is correctly clamped and with the required clamping force.

The measured or determined data are preferably checked for plausibility before the transmission and checked once again for plausibility after the transmission.

Due to the fact that measured data positively correlating with each other, such as the clamping forces measured by means of DMS sensors A1, A2, A3, A4, are compared by means of the two microprocessor units 15, 16 and checked for plausibility, pre-processing of the measurement data can already be carried out in transmitting device 14 and a reduced data quantity can if required be transmitted to receiving device 21. If the measured data are plausible, they are transmitted by transmitting device 14 to receiving device 21, whereas an error message is transmitted if implausible measurement data are detected. In addition to an error message, the measurement data can, if need be, also be transmitted. Either the actual measurement values, i.e., the clamping force with which the respective clamping spigot is clamped in the chuck, can be transmitted or alternatively a reduced data quantity in the sense of "clamping ok" can also be transmitted, if the measurement values are plausible. It may possibly also suffice to detect only the measurement values from two sensors lying diagonally opposite one another and to check the latter for plausibility. If, however, the data of all four DMS sensors A1, A2, A3, A4 are determined and checked for plausibility, it can also be ensured that all four clamping spigots are present on the workpiece carrier and none are missing.

In order to prevent errors in the transmission on the radio link, which can arise for example due to corruption of messages, unintentional repetition of messages, an incorrect sequence of messages, a loss of messages, a time delay of messages, insertion of corrupt information, e.g., due to a malfunction or due to an incorrect sender, appropriate measures must be taken.

The measurement data are preferably transmitted redundantly and in the form of digital data packets. The respective data packet can be provided with a coding secure against confusion, so that a corresponding assignment can be carried out at the receiver side.

At the receiver side, the data packets are received by the antenna and evaluated by means of the two microprocessor units 25, 26 of gateway 24. The transmitted measurement data are also preferably checked for plausibility by a cross-comparison at the receiver side. Apart from the cross-comparison, the absolute measurement values must also be used in addition to decide whether the clamping is correct or not.

In order to ensure positive reliability, a clamping signal—release signal—is generated by gateway 24 in the case of the detection of correct clamping, which is monitored by the machine control. Correctly clamped means that on the one hand the plausibility of the measurement values present is detected by cross-comparison and on the other hand a predetermined minimum clamping force is reached. The gateway preferably emits the release signal in the form of a binary signal, wherein the release signal assumes the value 1 when the detected measurement values are plausible and reach a predetermined value, and wherein the release signal assumes the value 0 when the detected measurement values are either not plausible or do not reach a predetermined value. Two release signals with the value 1 are generated independently of one another by means of two microprocessor units 25, 26 of gateway 24, when both microprocessor units 25, 26 detect correct clamping. The machine control is connected via two lines to gateway 24 for transmitting the release signal and only when the release signal of both lines assumes the value 1 is correct clamping detected by machine control 28. The release signal is thus transmitted redundantly—twice—to machine control 28.

When gateway 24 detects that inadmissible errors occur on the transmission link, an error is also generated and the release signal assumes the value 0. The effect of this would then be that the machine control stops the processing machine. In the case of a defect of the receiving device—electronics—or another malfunction such as for example a power failure or implausible measurement values, the release signal would also assume the value 0, as a result of which machine control 28 would again stop the processing machine.

Particularly preferably, the data are enhanced with redundant information in the wireless transmission, in order to detect corruptions and/or errors. As a result of the measures taken, errors and/or corruptions can be detected early and not just right at the end.

Although mention has been made previously of transmitting device 14 and receiving device 21 respectively, a unidirectional data transmission from transmitting device 14 to receiving device 21 does not take place exclusively, but on the contrary data can be transmitted also in the reverse direction, as was explained previously.

In any event, the measurement data or parameters relevant for secure clamping are detected twice, i.e. redundantly, with the monitoring device designed according to the invention, these measurement data are checked for plausibility by cross-comparison at the transmitter side by means of the two independent microprocessor units 15, 16, then transmitted redundantly, again double-checked and redundantly evaluated at the receiver side by means of the two independent microprocessor units 25, 26 of gateway 24 and finally transmitted again redundantly to machine control 28. A twofold safeguard is thus incorporated in each of these steps, so that ultimately the entire measurement chain including the wireless transmission functions securely and reliably.

Example 2

In this example, the measurement data of all the sensors of clamping device 3 are detected. The data of the same kinds of sensors are preferably compared with each other in each case and checked for plausibility. By means of the DMS sensors, the clamping quality of a clamped workpiece carrier can on the one hand be determined in the manner described above. In principle, it is the case that safety-relevant measurement values are always compared with one another.

On the other hand, the presence and the precise position of the workpiece carrier can be determined by means of further sensors B1, B2, B3, B4. Inductive sensors B1, B2, B3, B4 arranged in the region of the upper side of respective chuck 6, 7, 8, 9 can measure the precise distance of the workpiece carrier from the respective sensor. In this way, it can in particular be detected whether the workpiece carrier lies flat on clamping device 3 or the Z-support of respective chuck 6, 7, 8, 9 and, for example due to fouling, an undesired distance between the Z-support and the corresponding support of the workpiece carrier adversely affecting the processing accuracy of a workpiece clamped on the workpiece carrier is not present. It can thus be detected, for example, whether a chip is clamped under the pallet and the pallet thus does not lie on the point concerned for example by 0.1 mm. If incorrect mounting of the workpiece carrier is detected, an error message is emitted and the release signal assumes the value 0.

A further sensor C1, C2, C3, C4 is used in each case to monitor the position of an actuating piston used to actuate clamping elements. On the basis of the position of the actuating piston, information can be deduced with regard to whether the actuating piston is in the open position or locking position. This information can be used with regard to whether a clamping spigot can be introduced into the respective chuck or removed therefrom. A decision can of course thus also be made as to whether a workpiece carrier can be fed or removed by means of the robot. The feeding or removal of a workpiece carrier must however only take place when the actuating piston is in an open position.

Finally, the position of clamping device 3 can be determined by means of acceleration sensor 18. Vibrations of clamping device 3 can also be monitored with acceleration sensor 18.

Figure 2:
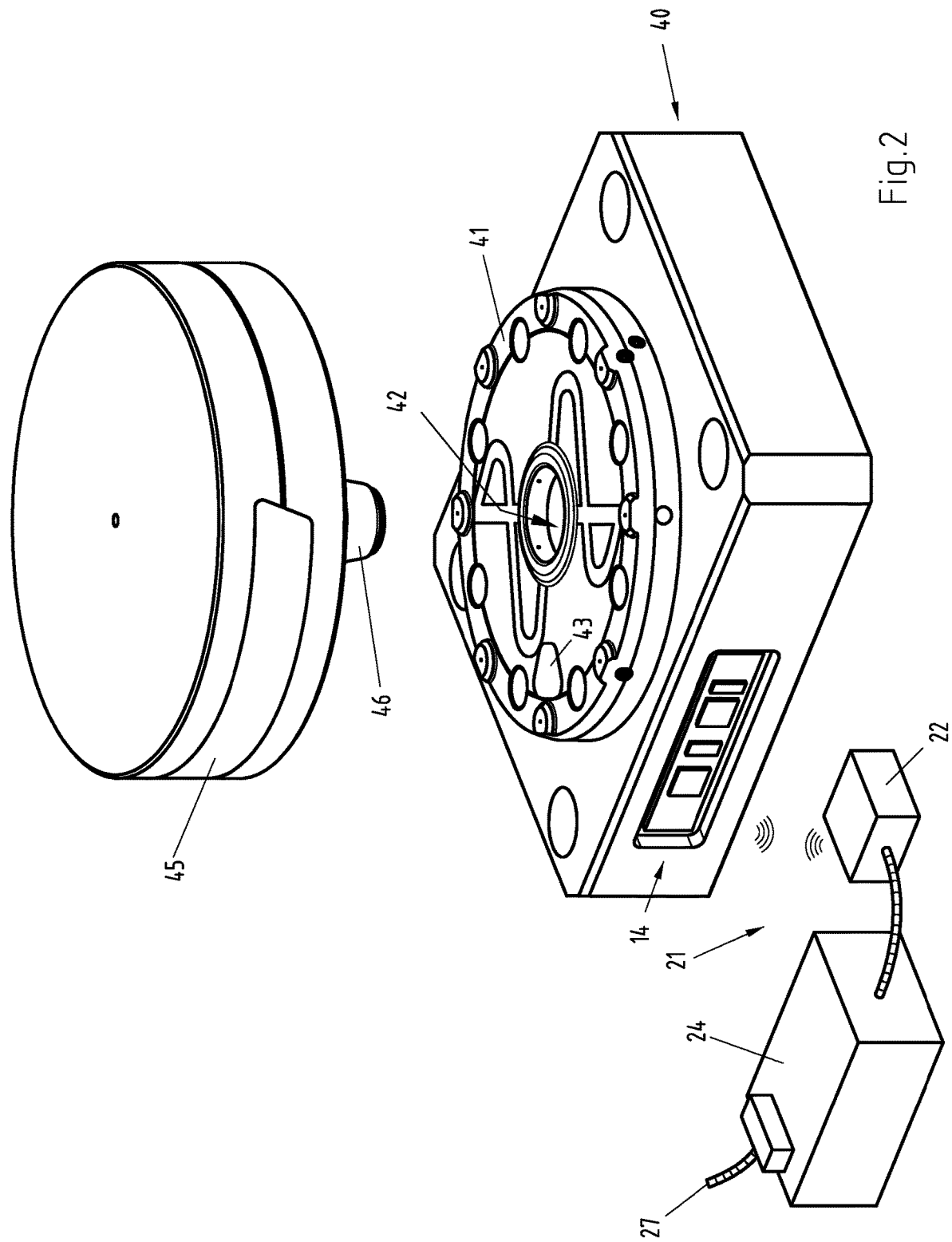
FIG. 2 a second clamping device together with a workpiece carrier and individual components of the monitoring device in a perspective view.

FIG. 2 shows a further embodiment of a clamping device 40 together with a workpiece carrier 45 and individual components of the monitoring device in a perspective view. The clamping device is constituted here as a single chuck 41. This chuck 41 is provided with a central locating hole 42 for receiving a clamping spigot 46 arranged on workpiece carrier 45. In this example, the monitoring device comprises, apart from transmitting device 14 arranged on clamping device 40 and receiving device 21 arranged distant therefrom, two sensors for determining the clamping force, a third sensor 43 for determining the position of workpiece carrier 45, a fourth sensor for monitoring the actuating piston serving to a actuate clamping elements and a fifth sensor for determining the position of clamping device 40, none of the sensors apart from third sensor 43 being shown in the representation according to FIG. 2.

The two first sensors serving to determine the clamping force are designed as DMS sensors, by means of which material-elastic deformations of chuck 41 can be measured. Third sensor 43 is an inductive sensor arranged on the upper side of chuck 41, by means of which the presence or the correct mounting of workpiece carrier 45 can be determined. The fourth sensor is an inductive sensor arranged in the interior of the chuck, which detects the position of the actuating piston serving to actuate clamping elements, i.e., whether the actuating piston is in the open position or the locking position. Finally, the fifth sensor is an acceleration sensor arranged on clamping device 40, by means of which the position and/or movements of chuck 41 can be detected.

Transmitting device 14 and also receiving device 21 are basically constituted the same as those of FIG. 1, wherein it can be seen in this representation that gateway 24 is provided with a multi-core cable 27, via which the release signal can be relayed redundantly to the machine control (not represented). Apart from multi-core cable 27 for the redundant transmission of the release signal, further lines are preferably also provided between gateway 24 and the machine control, for example to transmit additional information to the machine control, such as for example chuck open, no pallet present, pallet in place, pallet clamped, pallet clamped with 10 kN.

A difference of the monitoring device according to FIG. 2 compared with that in FIG. 1 consists in the fact that the latter comprises only two DMS sensors serving to determine the clamping force, which are arranged on single chuck 41. The two DMS sensors are arranged on chuck 41 in such a way that they detect measurement values positively correlating with one another. For this purpose, the two DMS sensors are fitted in the region of the upper side of chuck 41, in such a way that, when workpiece carrier 45 is clamped, they can repeatedly detect precisely elastic deformations of the material, i.e., material-elastic deformations of chuck 41. Correct clamping of workpiece 45 on clamping device 40 can thus be reliably and securely monitored with the two DMS sensors.

The two aforementioned DMS sensors are in principle sufficient to monitor the secure clamping of workpiece carrier 45 on chuck 41, since an elastic deformation of chuck 41 of predefined magnitude only occurs when a sufficiently great clamping force acts on clamping spigot 46. If, however, a clamping force of predefinable magnitude acts on clamping spigot 46, it can reliably be assumed that workpiece carrier 45 is securely clamped. If workpiece carrier 45 is not clamped or not correctly clamped, this can be detected by means of the two DMS sensors, since the elastic deformation of chuck 41 with an incorrect clamping of workpiece carrier 45 is smaller than with a correct clamping. The measurement values signaling correct clamping can be determined and stored by test measurements and calibration of the system. The measurement values of the DMS sensors are preferably already checked for plausibility in transmitting device 14 by means of a cross-comparison. If the measured values appear to be plausible, they are transmitted by means of transmitting device 14 to receiving device 21, i.e., when the measurement values do not appear to be plausible, an error message is transmitted. In addition to the error message, the measurement values can if required also be transmitted. The error message is received by receiving device 21 and a signal with the value 0 is accordingly present at both outputs of gateway 24, which is detected by the machine control. When the release signal assumes the value 0, any ongoing processing operation is interrupted, or cannot even be started.

If the measurement values appear to be plausible, they are transmitted by means of transmitting device 14 to receiving device 21 and evaluated there by means of the two microprocessor units 25, 26. The measurement values present are compared with a specified value—setpoint value. If both microprocessor units 25, 26 detect that the setpoint value is reached, correct clamping is detected and the release signal assumes the value 1. This release signal is transmitted redundantly to the machine control, preferably via separate lines. When the release signal assumes the value 1, a processing operation can be started or continued.

If, on the other hand, at least one of the two microprocessor units of receiving device 21 detects that the setpoint value is not reached, incorrect clamping is detected and the release signal assumes the value 0, which is again detected by the machine control. In this case, too, the release signal is transmitted redundantly to the machine control. As soon as the release signal assumes the value 0, any ongoing processing operation is interrupted or cannot even be started.

To sum up, it can thus be stated that correct clamping is detected only when the measurement values are both plausible and also reach a setpoint value. At all events, the release signal only assumes the value 1 when correspondingly high or predetermined measurement values are present at both sensors, which diverge from one another at most by a predetermined value. Irrespective of the physical embodiment of the lines/cables, it is important that the release signal is transmitted redundantly.

Apart from correct clamping of workpiece carrier 45, further states of clamping device 40 or of chuck 41 can be ascertained by means of the further sensors. By means of third sensor 43, it can be detected on the one hand whether a workpiece carrier 45 is mounted on chuck 41. The position of workpiece carrier 45 in relation to chuck 41 can also be determined from the magnitude of the measurement signal of third sensor 43, as has already been explained above. By means of the fourth sensor, the position of an actuating piston serving to actuate clamping elements—clamping balls—can be determined. In particular, it is possible to determine whether the actuating piston is in the initial or locking position. In the locking position, the clamping elements are pushed radially inwards, so that the latter abut or can abut friction-locked against the clamping spigot. If the actuating piston is pushed into the initial position, the clamping elements are in the open position or they can at least be pushed back into the open position. In the open position, therefore, clamping spigot 46 of workpiece carrier 45 can be introduced into locating hole 42 of chuck 41 or removed therefrom. The detection of the respective position of the actuating piston is important particularly in connection with the automatic equipping of clamping device 40 by means of a handling robot, in that it can be deduced from this whether workpiece carrier 45 can be fed or removed without damaging clamping device 40. Finally, the position of clamping device 40 can be determined by means of the fourth sensor, which is designed as an acceleration sensor. The clamping device 40 can, if need be, also be monitored during the processing of a workpiece with regard to shaking/vibrations by means of the fourth sensor.

The measurement data of the various sensors can be transmitted by means of transmitting device 14 redundantly in the manner described above to receiving device 21. It goes without saying that five sensors certainly do not have to be present, or that not all the measurement values have to be transmitted or at least all the measurement values do not always have to be transmitted to receiving device 21 when five sensors are present. In order to detect secure clamping of the workpiece carrier, it suffices in principle to evaluate the data of the two DMS sensors.

Figure 3:
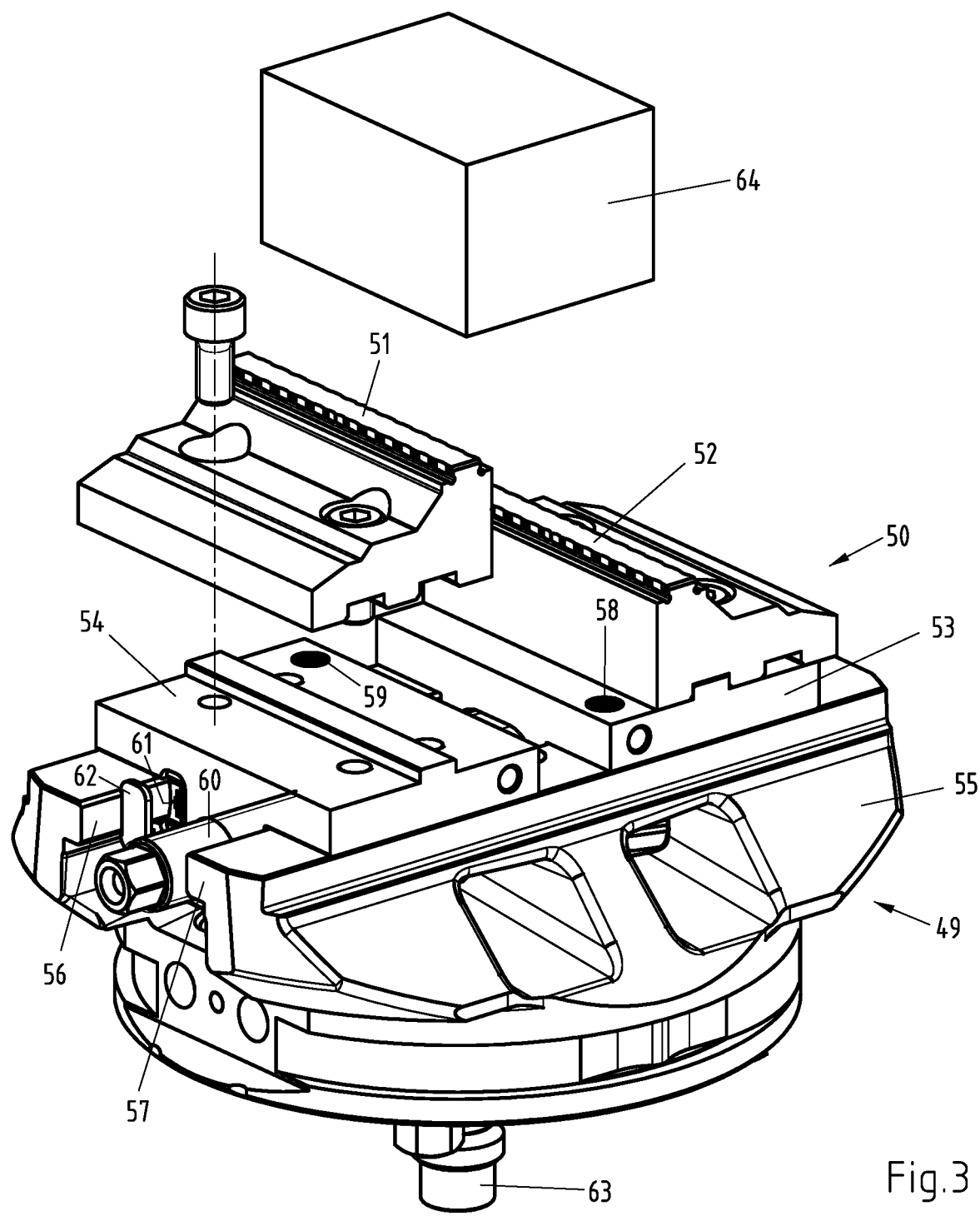
FIG. 3 a third clamping device constituted as a vice together with individual components of the monitoring device in a perspective view.

FIG. 3 shows a further clamping device 49 in a perspective representation. The clamping device again forms, together with the monitoring arrangement not represented, a clamping system. Clamping device 49 here is a vice 50 known per se, which is provided with two displaceable clamping jaws 51, 52, wherein one clamping jaw 51 is raised in the present representation. The two clamping jaws 51, 52 are actuated by means of a spindle 60. A diagrammatically represented workpiece 64 can be clamped between the two clamping jaws 51, 52. The two clamping jaws 51, 52 can be fixed by means of screws in each case on a guide block 53, 54. In order to fix a workpiece in vice 50, the latter is clamped between the two clamping jaws 51, 52. Vice 50 has a stable base body 55, which is provided towards the top with two parallel running guide rails 56, 57 for guiding the two displaceable guide blocks 53, 54. Vice 50 for its part is provided with a clamping spigot 63 fastened to the underside of base body 55, by means of which it can be fastened on a chuck, as is represented in FIG. 2. It goes without saying that vice 50 can also be fastened to a processing machine in a different way.

Clamping device 49 is provided with a transmitting device (not represented), as has already been explained previously. In order to monitor the clamping quality of a workpiece clamped between clamping jaws 51, 52, a DMS is arranged in each case on the two guide rails 56, 57, only one DMS 61 being shown in this representation. In order to protect the DMS against external influences, a cover cap 62 is provided. The respective DMS is positioned at a point on guide rail 56, 57, at which high forces and correspondingly high elastic material deformations occur during clamping of a workpiece, which can be measured by the DMS sensors. Due to the fact that the DMS sensors are arranged on guide rails 56, 57, the clamping force can be measured with these sensors irrespective of the clamping jaws used, so that clamping jaws 51, 52 can be exchanged without anything having to be changed on the DMS sensors.

Respective guide block 53, 54 is also provided with a respective sensor 58, 59 for the position detection of a clamped workpiece. Respective sensor 58, 59 is arranged in the outer region of a guide block 53, 54, in such a way that it measures at a right angle to the displacement direction of clamping jaws 51, 52 upwards, i.e., in the Z-direction, so that the distance between the lower side of a clamped workpiece and respective guide block 53, 54 can be detected. The two sensors 58, 59 lie diagonally opposite one another. Sensors 58, 59 for the position detection are preferably inductively operating sensors in the form of inductive proximity switches. In this way, obliquely clamped workpieces for example are intended to be able to be detected. Due to the fact that position detection sensors 58, 59 are arranged on guide blocks 53, 54, measurements can be taken with these sensors irrespective of the clamping jaws used.

Apart from the transmitting device and the receiving device, the aforementioned four sensors in turn form a part of the monitoring device. The transmitting device is preferably housed in a recess arranged in the region of the lower half of the vice. The transmitting device and also the receiving device are basically constructed the same as those of FIG. 1, so this will again not be dealt with in greater detail at this point. Since the two position detection sensors 58, 59 are arranged on a mobile part—guide block—of vice 50, the latter are connected via movable cables to the transmitting device housed in base body 55. The two DMS sensors are connected via conventional cables to the transmitting device. The latter can again be mutually checked for plausibility by means of a cross-comparison of the measurement data present at the two DMS sensors. By means of the two DMS sensors, therefore, the clamping quality of a clamped workpiece can thus be monitored redundantly in the manner previously described. Apart from the aforementioned four sensors, further sensors such as for example an acceleration sensor arranged on the vice could also be provided, by means of which the position and if required movements of the vice can be detected. In addition, a sensor could also be provided for example for measuring the distance between the two guide blocks 53, 54.

It goes without saying that the aforementioned examples of embodiment are not to be regarded as conclusive or comprehensive. Thus, for example, both the transmitting device and the receiving device could be provided with two independent transmitters and respectively receivers for the redundant transmission of the measurement values. For the monitoring of further parameters, additional sensors can also be provided on the chuck or the respective clamping device. A temperature sensor, for example, could also be used. The data of the further sensors could also be transmitted wireless by means of the transmitting device.

On the other hand, "simpler" variants of a monitoring device constituted according to the invention are also quite conceivable, wherein for example only the clamping force is monitored redundantly by means of two sensors, wherein the clamping force does not necessarily have to be absolute and detected with high resolution, but rather it can, as the case may be, suffice to detect and/or monitor the clamping force in steps, for example in two up to ten steps, and to transmit the latter by means of the transmitting device. A bidirectional data exchange between the transmitting device and the receiving device is also possible. Thus, for example, software updates can be transmitted from the receiving device to the transmitting device.

The term clamping quality is understood in the present connection to mean the ratio between the required clamping force (depending on the size of the component and the processing forces acting on the workpiece during its processing) and the actually measured clamping force or the measurement values present.

Several advantages of the monitoring device designed according to the invention are briefly summarized below:

The clamping quality between the workpiece carrier/ workpiece and a clamping device can be reliably monitored and transmitted wireless to a remote point;

The transmitted data can be detected, stored and externally evaluated;

The clamping quality of a clamped workpiece carrier or a clamped workpiece can be reliably and securely monitored with only two sensors;

The parameters can be monitored continuously;

The measurement of specific parameters increases the process reliability, wherein in particular the continuous monitoring of the clamping force or the pull-in force of the clamping spigot delivers meaningful and safety-relevant data;

An independent and redundant preparation of the measurement data can be ensured by the provision of two different microprocessors in the transmitting and the receiving device;

The entire measurement chain including the transmission and evaluation of the measurement data is structured reliably and redundantly.

| LIST OF REFERENCE NUMBERS | |
|---|---|
| 1. | Machine space |
| 2. | Clamping system |
| 3. | Clamping device |
| 4. | |
| 5. | Base plate |
| 6. | First chuck |
| 7. | Second chuck |
| 8. | Third chuck |
| 9. | Fourth chuck |
| 10. | |
| 11. | |
| 12. | Monitoring arrangement |
| 13. | |
| 14. | Transmitting device |
| 15. | First microprocessor unit |
| 16. | Second microprocessor unit |
| 17. | Transmitting antenna |
| 18. | Acceleration sensor |
| 19. | Feed |
| 20. | |
| 21. | Receiving device |
| 22. | Receiving antenna |
| 23. | First cable |
| 24. | Gateway |
| 25. | First microprocessor unit |
| 26. | Second microprocessor unit |
| 27. | Second cable |
| 28. | Machine control |
| 29. | Third cable |
| 30. | Handling robot |
| 31. | Fourth cable |
| 32. | Service tool |
| 33. | |
| 34. | First sensor module |
| 35. | Second sensor module |
| 36. | Third sensor module |
| 37. | Fourth sensor module |
| 38. | |
| 39. | |
| 40. | Clamping device |
| 41. | Chuck |
| 42. | Central hole |
| 43. | Sensor presence pallet |
| 44. | |
| 45. | Workpiece carrier (Pallet) |
| 46. | Clamping spigot |
| 47. | |
| 48. | |
| 49. | Clamping device |
| 50. | Vice |
| 51. | Clamping jaw |
| 52. | Clamping jaw |
| 53. | Guide block |
| 54. | Guide block |
| 55. | Base body |
| 56. | Guide rail |
| 57. | Guide rail |
| 58. | First position sensor |
| 59. | Second position sensor |
| 60. | Spindle |
| 61. | DMS |
| 62. | Cover |
| 63. | Clamping spigot |
| 64. | Workpiece |
| 65. | |
| 66. | |
| 67. | |
| 68. | |
| L1-L4 | Lines (sensor modules) |
| A1-C4 | Sensors |

The invention claimed is:

1. A monitoring arrangement for monitoring the clamping quality of a workpiece carrier or workpiece clamped in a clamping device, with at least one sensor to be arranged on the clamping device and a transmitting device for the wireless transmission of parameters determined by means of the sensor to a receiving device, characterized in that the monitoring arrangement comprises: at least two sensors arranged on said clamping device for the independent detection of the clamping quality of a clamped workpiece carrier or workpiece, and that the transmitting device is constituted such that it transmits one or more measurement values from each of said at least two sensors redundantly to the receiving device, wherein clamping quality is the ratio between a required clamping force and a measured clamping force based on said one or more measurement values, and wherein the least two sensors are arranged in such a way that their measurement values can correlate positively with one another; and two independent microprocessor units which are configured to evaluate the measurement values, transmitted by each of the at least two sensors, independently and redundantly relative to each other to determine if the measurement values of the at least two sensors correlate positively with one another by cross-comparison of the respective measurement values.

2. The monitoring arrangement according to claim 1, characterized in that the monitoring arrangement comprises at least one sensor module, by means of which measurement values generated by the at least two sensors are digitalized and transmitted to the transmitting device.

3. The monitoring arrangement according to claim 2, characterized in that the transmitting device is provided with two independent microprocessor units, which are configured to prepare the measurement values, transmitted by each of the at least two sensors, independently and redundantly relative to each other.

4. The monitoring arrangement according to claim 3, characterized in that the transmitting device comprises at least one transmitting antenna for the transmission of the measurement values prepared by means of the two independent microprocessor units.

5. The monitoring arrangement according to claim 1, characterized in that at least two sensors are strain gauge sensors designed and arranged in such a way that material-elastic deformations of a chuck or vice of the clamping device can be measured during the clamping of a workpiece carrier or a workpiece.

6. The monitoring arrangement according to claim 1, for monitoring the clamping quality of a workpiece carrier clamped by means of the clamping device, characterized in that the monitoring arrangement comprises at least one further sensor associated with said clamping device, by means of which the mounting of the workpiece carrier on the clamping device can be detected.

7. The monitoring arrangement according to claim 1, for monitoring the clamping quality of a workpiece clamped in a vice of a clamping device, wherein the vice is provided with two guide blocks and wherein a clamping jaw for clamping a workpiece is fastened on each guide block, characterized in that the monitoring arrangement comprises at least two further sensors, by means of which the mounting of a workpiece on the respective guide block of the vice can be detected.

8. The monitoring arrangement according to claim 1, characterized in that the monitoring arrangement is provided with a further sensor associated with said clamping device, by means of which the position of an element serving to activate clamping elements can be detected.

9. The monitoring arrangement according to claim 1, characterized in that the monitoring arrangement comprises a receiving antenna for receiving data transmitted by means of the transmitting device and a gateway connected to the receiving antenna, wherein the gateway is provided with two independent microprocessor units, by means of which the received data are independently and redundantly further processed in each case, and wherein the gateway is connected to a machine control of a processing machine.

10. The monitoring arrangement according to claim 9, characterized in that the gateway processes the measurement values transmitted by the transmitting device in such a way that, when agreement of the detected measurement values is ascertained and predetermined measurement values of the machine control are reached, a signal is outputted redundantly to the machine control for a correctly clamped workpiece carrier or a correctly clamped workpiece.

11. The monitoring arrangement according to claim 1, characterized in that the sensors are strain gauge sensors, which are fitted friction-locked and/or firmly bonded to a chuck or a vice of the clamping device in such a way that their signal is essentially proportional to the clamping force.

12. The monitoring arrangement according to claim 1, characterized in that the clamping device comprises at least one chuck for clamping a workpiece carrier, and that the chuck comprises a sensor arranged in a region of an upper side of the at least one chuck for detecting the mounting of the workpiece carrier.

13. The monitoring arrangement according to claim 1, characterized in that the clamping device comprises a chuck for clamping a workpiece carrier provided with a clamping spigot, wherein the chuck is provided with an actuating piston displaceable between an initial and a locking position for actuating clamping elements for clamping the clamping spigot, characterized in that the chuck is provided with a further sensor for monitoring the position of the actuating piston.

14. The monitoring arrangement according to claim 1, characterized in that the clamping device comprises at least two chucks for clamping a workpiece carrier provided with a number of clamping spigots corresponding to the number of chucks, wherein each chuck is provided with an actuating piston displaceable between an initial and a locking position for actuating clamping elements for clamping the respective clamping spigot, characterized in that at least one chuck of the at least two chucks is provided with a further sensor for monitoring the position of the actuating piston.

15. The monitoring arrangement according to claim 1, characterized in that the clamping device is constituted as a vice with two clamping jaws, wherein a sensor for determining the clamping force of a clamped workpiece is assigned to each clamping jaw.

* * * * *